US012680899B2

(12) United States Patent
Zhao et al.

(10) Patent No.: US 12,680,899 B2
(45) Date of Patent: Jul. 14, 2026

(54) PRESSURE MEASUREMENTS BY SIGNAL FITTING

(71) Applicant: KINGFAR INTERNATIONAL INC., Beijing (CN)

(72) Inventors: Qichao Zhao, Beijing (CN); Ran Yang, Beijing (CN); Zhao Li, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 373 days.

(21) Appl. No.: 18/497,960

(22) Filed: Oct. 30, 2023

(65) Prior Publication Data

US 2024/0219254 A1    Jul. 4, 2024

(30) Foreign Application Priority Data

Dec. 31, 2022    (CN) .......................... 202211736980.2

(51) Int. Cl.
*G01L 25/00* (2006.01)
*G01L 1/20* (2006.01)

(52) U.S. Cl.
CPC ................ *G01L 25/00* (2013.01); *G01L 1/20* (2013.01)

(58) Field of Classification Search
CPC ..... G01L 1/2275; G01L 1/205; G01L 5/0066; G06F 3/0418
See application file for complete search history.

(56) References Cited

U.S. PATENT DOCUMENTS

| 5,440,237 A | 8/1995 | Brown et al. | |
| 6,505,522 B1 * | 1/2003 | Wilssens | .............. A61B 5/1036 |
| | | | 73/862.51 |

(Continued)

FOREIGN PATENT DOCUMENTS

| CN | 107101780 A | 8/2017 |
| CN | 109883583 A | 6/2019 |

(Continued)

OTHER PUBLICATIONS

Extended European Search Report, issued in the corresponding European patent application No. 23203973.5, dated Mar. 27, 2024, 7 pages.

(Continued)

*Primary Examiner* — Tran M. Tran

(74) *Attorney, Agent, or Firm* — HSML P.C.

(57) ABSTRACT

A pressure signal fitting method comprises applying a pressure to each sensing point in a pressure sensor, measuring and integrating a relationship between the pressure and a resistance of each sensing point to obtain a pressure-resistance relationship; correcting the pressure-resistance relationship through a numerical filtering algorithm, and fitting the corrected pressure-resistance relationship to obtain an optimized pressure-resistance relationship; switching sensing points of a voltage sensing circuit to measure voltages of a plurality of arrayed sensing points pressurized; calculating resistances of the plurality of arrayed sensing points according to the measured voltages; calculating pressures of the plurality of arrayed sensing points through the optimized pressure-resistance relationship; and based on areas of pressure zones and non-pressure zones of the plurality of sensing points, calculating actual pressures of the plurality of arrayed sensing points from the calculated pressures thereof.

16 Claims, 7 Drawing Sheets

(56) References Cited

U.S. PATENT DOCUMENTS

| | | | | |
|---|---|---|---|---|
| 7,562,572 B2 * | 7/2009 | You | G01L 1/205 73/379.03 | |
| 7,591,165 B2 * | 9/2009 | Papakostas | G01L 27/002 702/100 | |
| 9,500,552 B2 * | 11/2016 | Williams | G01L 1/205 | |
| 9,851,828 B2 * | 12/2017 | Richards | G06F 3/0446 | |
| 10,139,959 B2 * | 11/2018 | Butler | G06F 3/046 | |
| 10,248,255 B2 * | 4/2019 | Lu | H10D 86/40 | |
| 10,402,030 B2 * | 9/2019 | Yao | G06F 3/045 | |
| 11,680,968 B2 * | 6/2023 | Thompson | G01L 1/205 324/123 R | |
| 11,775,113 B2 * | 10/2023 | Chang | G06F 3/0445 345/174 | |
| 11,839,450 B2 * | 12/2023 | Montgomery, II | A61B 5/4809 | |
| 11,982,583 B2 * | 5/2024 | Tomo | G01L 1/12 | |
| 12,158,386 B2 * | 12/2024 | Wiles | G01L 1/20 | |
| 12,207,905 B2 * | 1/2025 | Han | G01L 9/0052 | |
| 12,345,584 B2 * | 7/2025 | Chang | G01L 1/2293 | |
| 12,416,989 B2 * | 9/2025 | Wang | G06F 3/041 | |

| | | | | |
|---|---|---|---|---|
| 2006/0161364 A1 * | 7/2006 | Wang | G01L 9/0072 702/98 | |
| 2007/0235231 A1 * | 10/2007 | Loomis | G01L 1/205 178/18.06 | |
| 2016/0320914 A1 | 11/2016 | Tachikawa et al. | | |

FOREIGN PATENT DOCUMENTS

| | | |
|---|---|---|
| CN | 111289157 A | 6/2020 |
| CN | 112014007 A | 12/2020 |
| CN | 113229801 A | 8/2021 |
| CN | 113970393 A | 1/2022 |
| CN | 114878033 A | 8/2022 |
| CN | 115508003 A | 12/2022 |
| JP | 2005-106513 | 4/2005 |

OTHER PUBLICATIONS

First Chinese Office Action and Search Report, issued in the corresponding Chinese patent application No. 202211736980.2, dated Oct. 30, 2025, 20 pages with the machine translation.

* cited by examiner

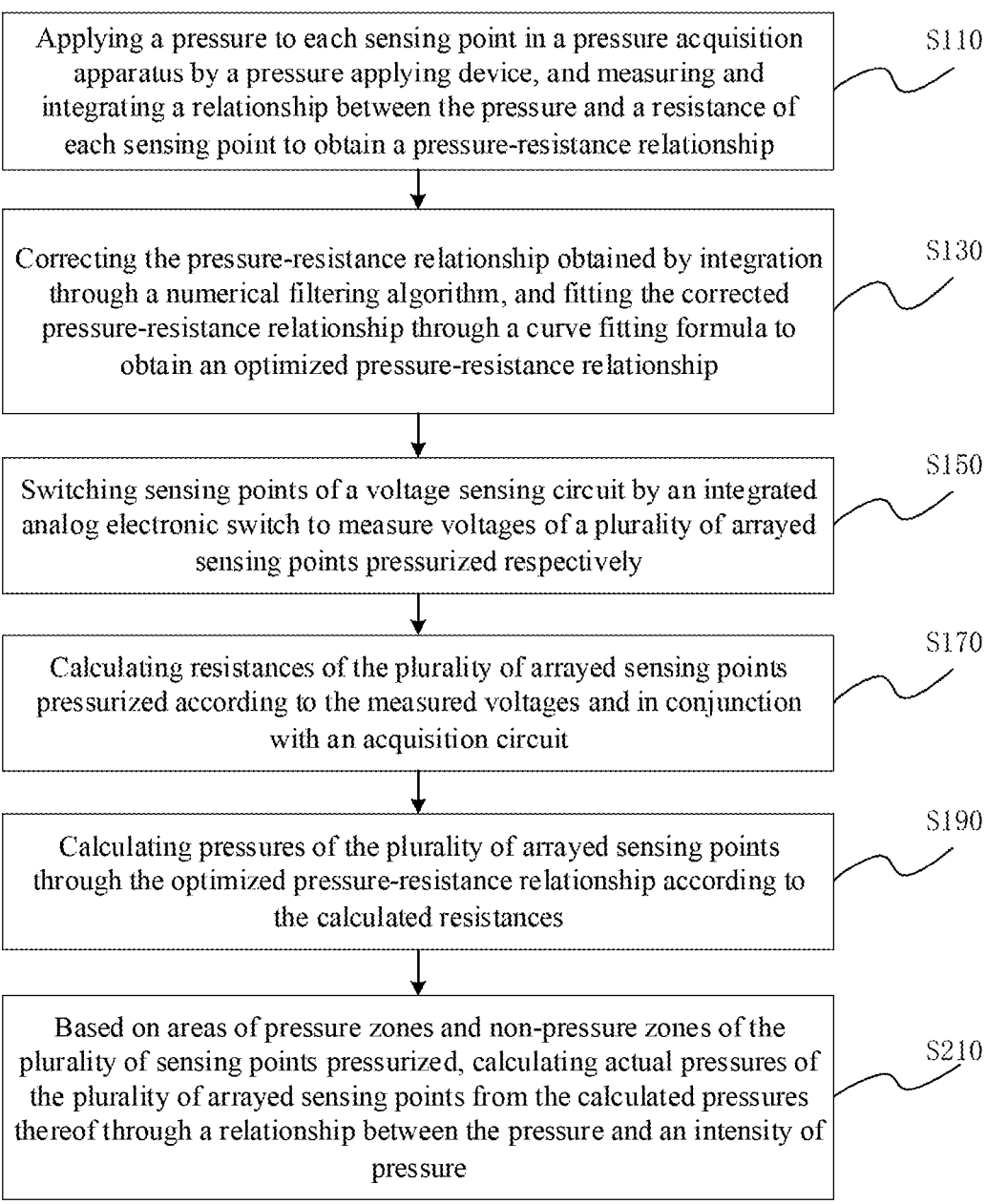

Applying a pressure to each sensing point in a pressure acquisition apparatus by a pressure applying device, and measuring and integrating a relationship between the pressure and a resistance of each sensing point to obtain a pressure-resistance relationship

S110

Correcting the pressure-resistance relationship obtained by integration through a numerical filtering algorithm, and fitting the corrected pressure-resistance relationship through a curve fitting formula to obtain an optimized pressure-resistance relationship

S130

Switching sensing points of a voltage sensing circuit by an integrated analog electronic switch to measure voltages of a plurality of arrayed sensing points pressurized respectively

S150

Calculating resistances of the plurality of arrayed sensing points pressurized according to the measured voltages and in conjunction with an acquisition circuit

S170

Calculating pressures of the plurality of arrayed sensing points through the optimized pressure-resistance relationship according to the calculated resistances

S190

Based on areas of pressure zones and non-pressure zones of the plurality of sensing points pressurized, calculating actual pressures of the plurality of arrayed sensing points from the calculated pressures thereof through a relationship between the pressure and an intensity of pressure

PRESSURE MEASUREMENTS BY SIGNAL FITTING

This application claims priority to Chinese Patent Application No. 202211736980.2, filed on Dec. 31, 2022, which is hereby incorporated by reference in its entirety.

TECHNICAL FIELD

The present disclosure relates to the technical field of signal fitting, and particularly to a pressure signal fitting method and apparatus.

BACKGROUND

Data fitting is a key link in a sensor measurement system and can quantitatively analyze a physical signal of a sensor. FSR is a pressure distribution measurement product, and its data fitting varies with the measuring sensor used. Product data manuals of FSR measuring sensors provided by different manufacturers include the following key information: a pressure range of an sensing point during normal operation and a pressure-resistance relationship table (curve) of the sensing point. The pressure-resistance relationship curve is illustrated in FIG. 1, and it is obtained by operations in a specific environment. During an operation in an actual environment, within a measurement range described in the data manual, a resistance and an actual pressure of the sensing point basically follow a corresponding relationship introduced in the data manual, but there may be consistency differences among the sensing points. Therefore, the FSR measuring sensors of different manufacturers have the following problems: the measurement ranges may be different, there are consistency differences in the measurement of the sensing point, other interferences may be introduced into measuring circuits, the same circuit shows different pressure effects when connected to different pressure points, etc. Usually, theoretical derivation, numerical filtering and result calibration are needed to achieve accurate measurement results.

Therefore, a pressure signal fitting solution which can be carried out in the actual environment is needed.

SUMMARY

In view of the above problems, the embodiments of the present disclosure provide a pressure signal fitting method and apparatus to eliminate or improve one or more defects in the prior art.

An aspect of the present disclosure provides a pressure signal fitting method, comprising the steps of:

applying a pressure to each sensing point in a pressure acquisition apparatus by a pressure applying device, and measuring and integrating a relationship between the pressure and a resistance of each pressurized sensing point to obtain a pressure-resistance relationship;

correcting the pressure-resistance relationship obtained by integration through a numerical filtering algorithm, and fitting the corrected pressure-resistance relationship through a curve fitting formula to obtain an optimized pressure-resistance relationship;

switching sensing points of a voltage sensing circuit by an integrated analog electronic switch to measure voltages of a plurality of arrayed sensing points pressurized respectively;

calculating resistances of the plurality of arrayed sensing points pressurized according to the measured voltages and in conjunction with an acquisition circuit;

calculating pressures of the plurality of arrayed sensing points through the optimized pressure-resistance relationship according to the calculated resistances; and based on areas of pressure zones and non-pressure zones of the plurality of sensing points pressurized, calculating actual pressures of the plurality of arrayed sensing points from the calculated pressures thereof through a relationship between the pressure and an intensity of pressure.

In some embodiments of the present disclosure, the method further comprises visually displaying the optimized pressure-resistance relationship through a point depiction method using drawing software.

In some embodiments of the present disclosure, measuring voltages of a plurality of arrayed sensing points pressurized respectively comprises:

measuring voltages of the plurality of arrayed sensing points pressurized by an on-chip integrated analog electronic switch or an off-chip digital-to-analog converter.

In some embodiments of the present disclosure, the method further comprises outputting the measured voltages through a conversion unit of the digital-to-analog converter.

In some embodiments of the present disclosure, the method further comprises appropriately increasing or decreasing the number of the integrated analog electronic switches based on the number of rows and columns of the pressure sensor.

In some embodiments of the present disclosure, the method further comprises displaying a zone where the pressure applying device applies the pressure to the arrayed sensing points through a heat map.

In some embodiments of the present disclosure, fitting the corrected pressure-resistance relationship through a curve fitting formula comprises:

selecting corresponding curve fitting betweenness to fit the corrected pressure-resistance relationship.

Another aspect of the present disclosure provides a pressure signal fitting apparatus comprising a processor and a memory, wherein the memory stores computer instructions, and the processor is configured to execute the computer instructions stored in the memory, and the apparatus realizes the steps of the aforementioned method when the computer instructions are executed by the processor.

The present disclosure further provides a computer-readable storage medium having a computer program stored thereon, wherein when executed by a processor, the program realizes the steps of the aforementioned method.

The pressure signal fitting method and apparatus of the present disclosure can correct the measured pressure-resistance relationship through a numerical filtering algorithm, and fit the corrected pressure-resistance relationship according to appropriately selected curve fitting betweenness, thereby standardizing the signal fitting process and improving the signal measurement accuracy. In addition, the voltages of arrayed sensing points can be switched and measured by an integrated analog switch, thereby realizing the multi-channel signal switching and improving the signal acquisition efficiency.

Additional advantages, objectives and features of the present disclosure will be partially set forth in the description below; and partially apparent to those of ordinary skill in the art upon examination of the following content, or may be learned from the practice of the present disclosure. The objectives and other advantages of the present disclosure can be realized and attained by the structure particularly pointed out in the specification and the drawings.

It will be appreciated by those skilled in the art that the objectives and advantages that can be achieved by the present disclosure are not limited to those specifically described above, and the above and other objectives that can be achieved by the present disclosure will be more clearly understood from the following detailed description.

BRIEF DESCRIPTION OF THE DRAWINGS

The drawings described here provide a further understanding of the present disclosure and constitute a part thereof, rather than limiting the present disclosure. In the drawings:

FIG. 2 is a schematic diagram of a pressure signal fitting method according to an embodiment of the present disclosure.

DETAILED DESCRIPTION OF THE PREFERRED EMBODIMENTS

Figure 1:
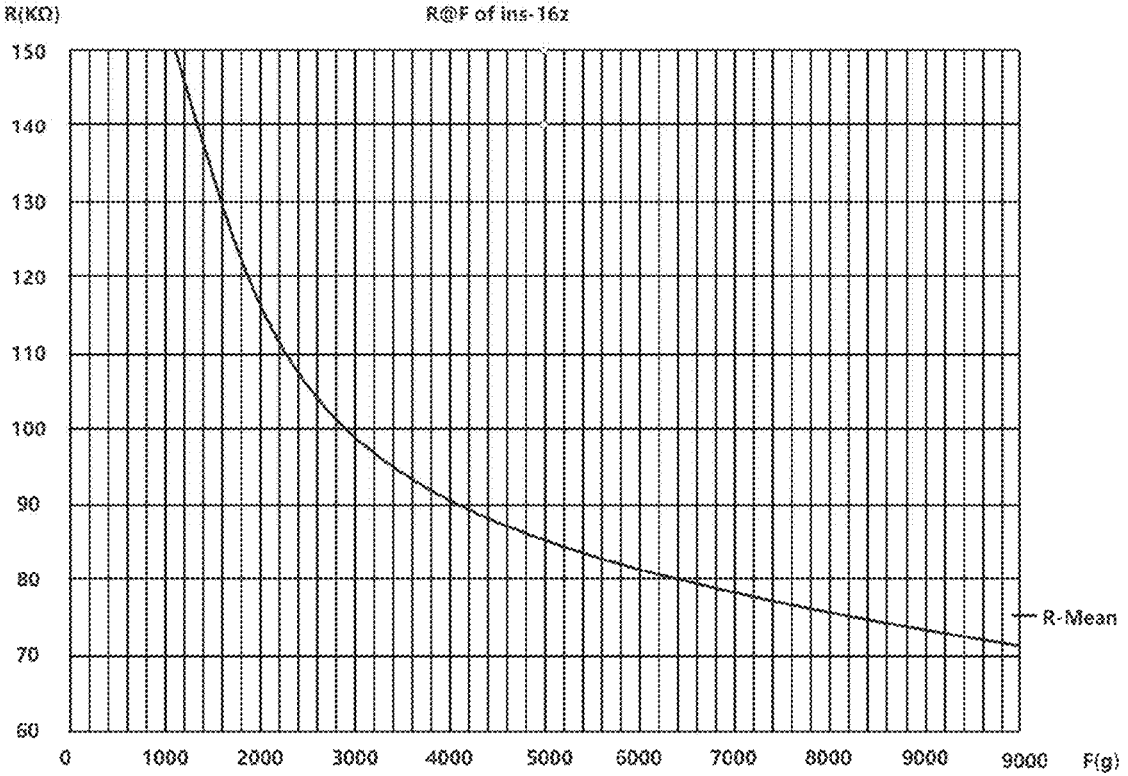
FIG. 1 is a pressure-resistance relationship graph measured by a manufacturer.

In order that the objectives, technical solutions and advantages of the present disclosure are clearer, the present disclosure will be further described in detail with reference to the embodiments and the drawings. Here, the exemplary embodiments of the present disclosure and the description thereof are used to explain the present disclosure, rather than being limitations thereto.

It should also be noted that in order to avoid the present disclosure from being obscured by unnecessary details, only the structures and/or processing steps closely related to the solutions according to the present disclosure are illustrated in the drawings, and other details not so related to the present disclosure are omitted.

It should be emphasized that the term 'comprise/include' used herein refers to the presence of features, elements, steps or components, but does not exclude the presence or addition of one or more other features, elements, steps or components.

It should also be noted that unless otherwise specified, the term 'connection' used herein refers to not only a direct connection, but also an indirect connection with an intermediate.

Hereinafter, the embodiments of the present disclosure will be described with reference to the drawings, in which the same reference numerals represent the same or similar parts, or the same or similar steps.

In order to overcome the problems of consistency differences in the sensing points, different measurement ranges and showing different pressure effects, the present disclosure proposes a pressure signal fitting method and apparatus, which can correct the measured pressure-resistance relationship through a numerical filtering algorithm, and fit the corrected pressure-resistance relationship according to the appropriately selected curve fitting betweenness, thereby standardizing the signal fitting process and improving the signal measurement accuracy. In addition, the voltages of arrayed sensing points can be switched and measured by an integrated analog switch, thereby realizing the multi-channel signal switching and improving the signal acquisition efficiency.

FIG. 2 is a pressure signal fitting method according to an embodiment of the present disclosure, and as illustrated in FIG. 2, the method includes:

Step S110: applying a pressure to each sensing point in a pressure acquisition apparatus by a pressure applying device, and measuring and integrating a relationship between the pressure and a resistance of each sensing point to obtain a pressure-resistance relationship.

In this step, a pressure is applied to each sensing point in the pressure acquisition apparatus by a pressure applying device, and the pressure and the resistance of each pressurized sensing point are measured respectively to form a pressure-resistance relationship thereof, which is integrated to obtain a pressure-resistance relationship for all the sensing points in the pressure acquisition apparatus.

In an embodiment of the present disclosure, each sensing point pressurized in the pressure acquisition apparatus is equivalent to an adjustable resistor, and the measured resistance varies with the pressure of each sensing point. Therefore, each sensing point has a different pressure-resistance relationship, which is integrated to obtain an overall pressure-resistance relationship of the pressure acquisition apparatus, wherein an integration mode includes, but is not limited to a weighted average summation or an arithmetic average summation.

In an embodiment of the present disclosure, the pressure sensor used in the pressure acquisition apparatus includes, but is not limited to an FSR pressure sensor.

Step S130: correcting the pressure-resistance relationship obtained by integration through a numerical filtering algorithm, and fitting the corrected pressure-resistance relationship through a curve fitting formula to obtain an optimized pressure-resistance relationship.

In this step, the pressure-resistance relationship obtained by integration is corrected through a numerical filtering algorithm, and appropriate curve fitting betweenness is selected to fit the corrected pressure-resistance relationship, so as to obtain an optimized pressure-resistance relationship.

Figure 3:
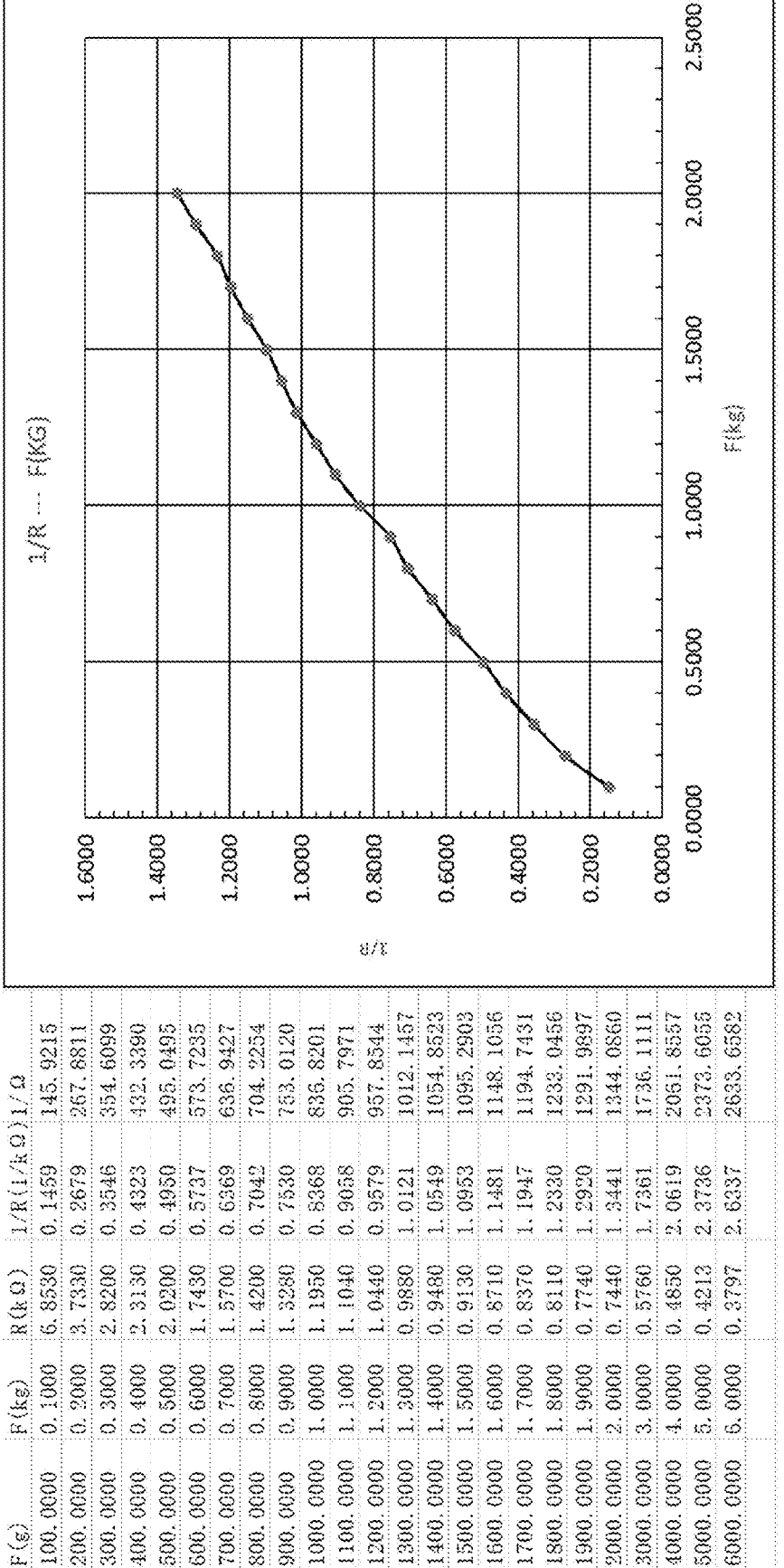
FIG. 3 is a pressure-resistance relationship graph after fitting according to an embodiment of the present disclosure.

In an embodiment of the present disclosure, a curve of the optimized pressure-resistance relationship obtained by fitting the corrected pressure-resistance relationship through a curve fitting formula is illustrated in FIG. 3, where a horizontal axis (x) indicates a magnitude of the pressure in kilograms (kg) and a vertical axis (v) indicates conductance (a reciprocal of the resistance) of the pressurized sensing point, and the illustrated curve fitting formula is:

$$y = 0.5537x^2 + 0.7827x - 0.0353.$$

In which, the specific values of the pressure and the resistance are given in the left of FIG. 3. Because the measuring system of the pressure acquisition apparatus generally adopts an integrated analog switch (MXU) for processing, it is necessary to reasonably select the curve fitting betweenness, which should not be too high, and the curve fitting formula varies with the selected curve fitting betweenness, so the curve fitting formula described above is only an example, and the present disclosure is not limited thereto.

In an embodiment of the present disclosure, the optimized pressure-resistance relationship may be visually displayed with drawing software through a point depiction method. For example, the pressure-resistance relationship is visually displayed with the software such as Excel or MATLAB.

Step S150: switching sensing points of a voltage sensing circuit by an integrated analog electronic switch to measure voltages of a plurality of arrayed sensing points pressurized respectively.

In this step, the circuits of column sensing points and row sensing points are switched by an integrated analog electronic switch, so as to measure the voltages of the column sensing points and row sensing points, respectively.

Figure 4:
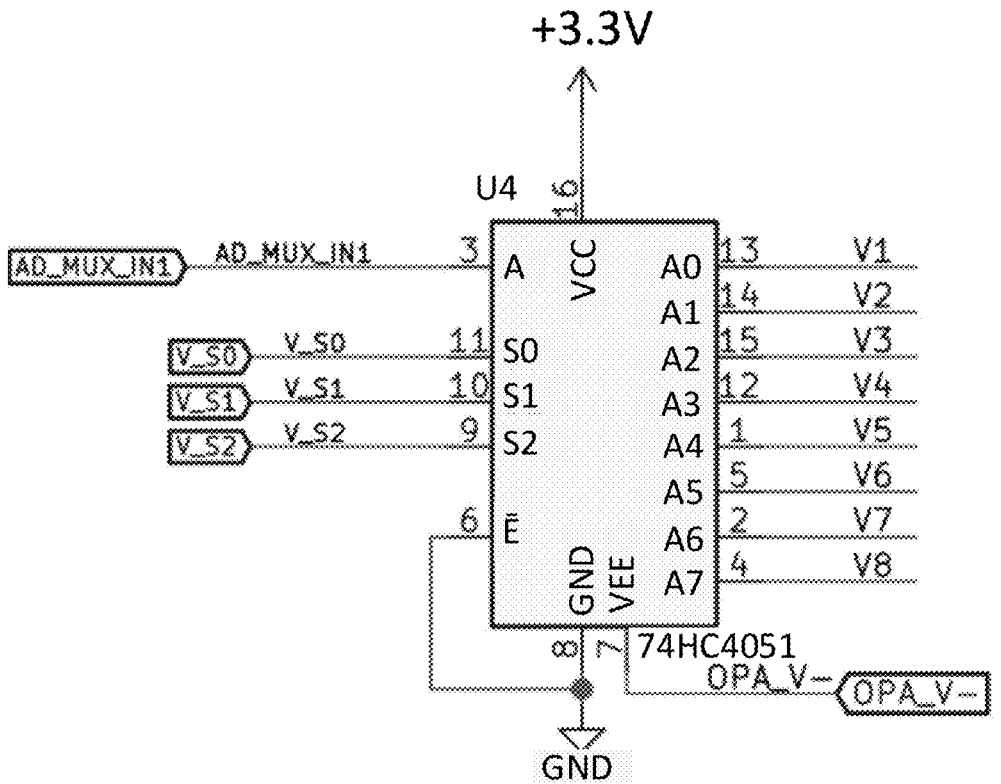
FIG. 4 is a schematic diagram of pins of a digital-to-analog converter according to an embodiment of the present disclosure.

In an embodiment of the present disclosure, the digital-to-analog converter is used to measure the voltages of a plurality of arrayed sensing points pressurized, but the number of channels of the digital-to-analog converter is limited, and when the plurality of arrayed sensing points are measured, it is necessary to switch through an analog electronic switch. In the embodiment of the present disclosure, the digital-to-analog converter adopts 74HC4051, and the pins are illustrated in FIG. 4. The digital-to-analog converter includes eight input channels (A0 to A7), three digital selection terminals (S0 to S2), one effective enabling terminal (E), one positive power supply terminal (VCC), one negative power supply terminal (VEE), one ground terminal (GND) and one common output terminal (A), wherein the common output terminal is connected to an integrated analog electronic switch. During the voltage measurement, the digital selection terminals (S0 to S2) are controlled by the integrated analog electronic switch to select which of the input terminals (A0 to A7) should be connected to the common output terminal. When one terminal is selected to be connected to the common output terminal, the signals of other terminals are disconnected, so as to measure the voltage.

Figure 5:
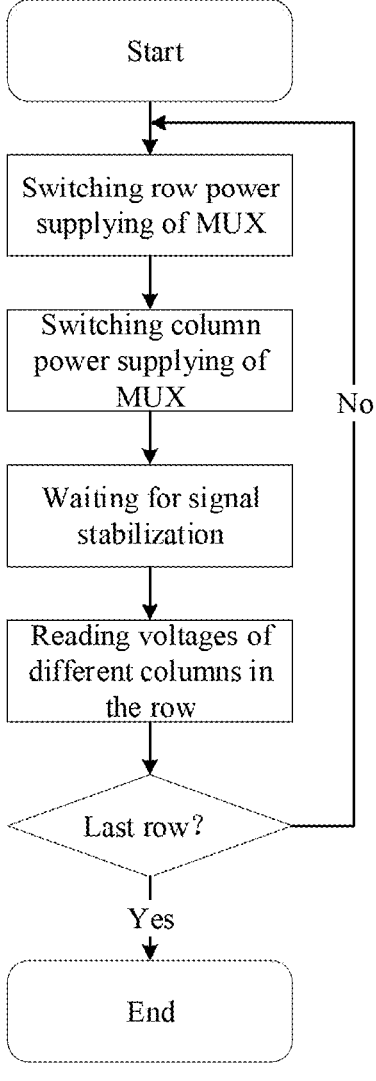
FIG. 5 is a flowchart of a voltage acquisition at arrayed sensing points according to an embodiment of the present disclosure.

In an embodiment of the present disclosure, a flowchart of a voltage measurement is illustrated in FIG. 5. The integrated analog electronic switch switches to row sensing points for a power supply. After the power supply is completed, the integrated analog electronic switch switches to column sensing points for a power supply, and after the signal is stable, the voltages of different columns in the row are read to complete the voltage measurement.

In an embodiment of the present disclosure, the voltages of the arrayed sensing points pressurized may be measured by an on-chip integrated analog electronic switch or an off-chip digital-to-analog converter.

In an embodiment of the present disclosure, the measured voltages are output by a conversion unit of the digital-to-analog converter.

In an embodiment of the present disclosure, based on the diversification of the types, the number of channels and the control modes of the integrated analog electronic switch, the model thereof is not limited in the present disclosure.

In an embodiment of the present disclosure, during actual operations, the number of the integrated analog electronic switches may be appropriately increased or decreased according to the number of rows and columns of the arrayed sensing points in the actual pressure sensor, so that the voltages of more arrayed sensing points can be measured using a digital-to-analog converter with fewer channels.

Step S170: calculating resistances of the plurality of arrayed sensing points pressurized according to the measured voltages and in conjunction with an acquisition circuit.

In this step, based on the voltages measured in step S150, the resistances of the plurality of arrayed sensing points pressurized are calculated by an acquisition circuit of the pressure acquisition apparatus.

In an embodiment of the present disclosure, the acquisition circuit of the pressure acquisition apparatus may include a programmable gain amplifier (PGA) or is connected in series with a fixed resistor for voltage division, and the resistances of the plurality of arrayed sensing points pressurized are calculated according to the measured voltages and in conjunction with the settings of the acquisition circuit.

Step S190: calculating pressures of the plurality of arrayed sensing points through the optimized pressure-resistance relationship according to the calculated resistances.

In an embodiment of the present disclosure, the pressures of the plurality of arrayed sensing points are calculated based on the pressure-resistance relationship optimized in step S130 and the resistances calculated in step S170.

Step S210: based on areas of pressure zones and non-pressure zones of the plurality of sensing points pressurized, calculating actual pressures of the plurality of arrayed sensing points from the calculated pressures thereof through a relationship between the pressure and an intensity of pressure.

In this step, a pressure is applied to the arrayed sensing points, and the areas of pressure zones and non-pressure zones of the sensing points pressurized are obtained according to the pressures of the arrayed sensing points, and the actual pressures of the plurality of arrayed sensing points are obtained from the pressures thereof calculated in Step S190 through a relationship between the pressure and an intensity of pressure.

Figure 6:
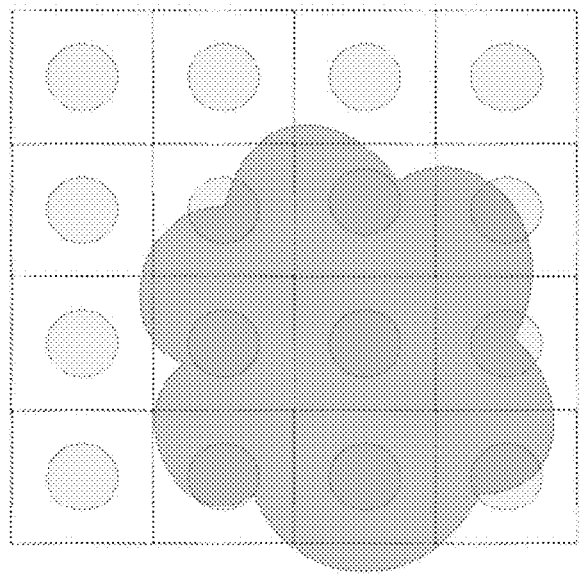
FIG. 6 is a schematic diagram of pressures of arrayed sensing points according to an embodiment of the present disclosure.

In an embodiment of the present disclosure, the pressure is applied to the arrayed sensing points in a large area as illustrated in FIG. 6, in which a circular zone is a pressure sensing zone, a white zone is a non-pressure sensing point zone, and a dark zone is a pressure zone (pressure application zone).

Figure 7:
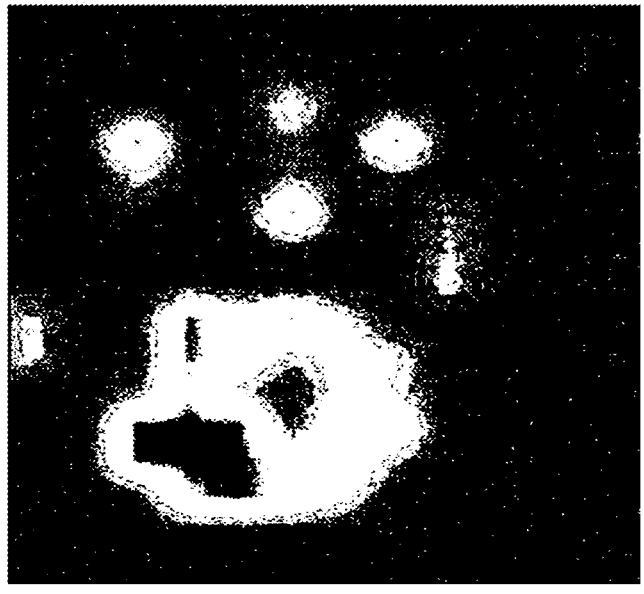
FIG. 7 is a heat map of pressures of arrayed sensing points according to an embodiment of the present disclosure.

In an embodiment of the present disclosure, the pressure is applied to the pressure sensor by a palm, and a heat map may be displayed in an upper computer as illustrated in FIG. 7, in which a white zone is a pressure zone.

Figure 8:
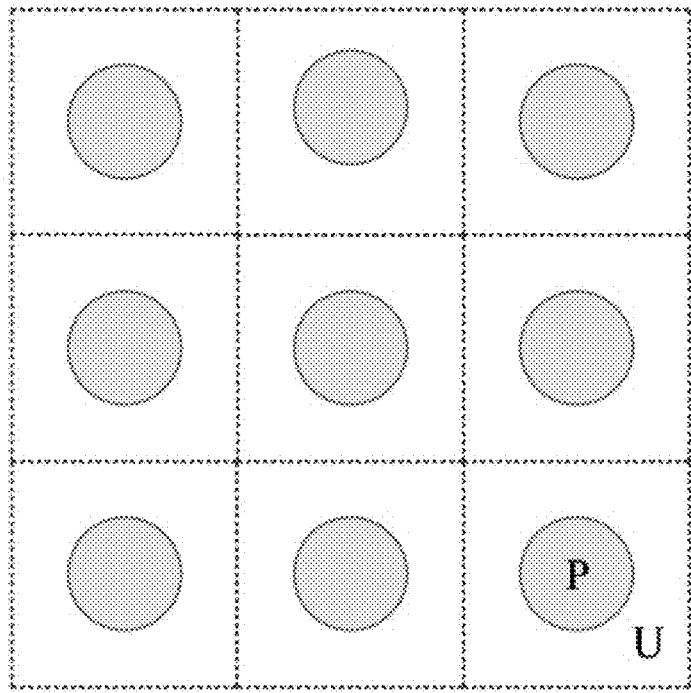
FIG. 8 is a schematic diagram of pressure areas of arrayed sensing points according to an embodiment of the present disclosure.

In an embodiment of the present disclosure, when the pressure is applied to the arrayed sensing points in a large area by the pressure applying device, the pressure is generally uniform, and the array-type FSR may be equally divided into n measuring units. The pressure areas of the arrayed sensing points are illustrated in FIG. 8, in which a FSR has 9 units, and each unit composed of a zone P where the pressure can be measured and a zone U where the pressure cannot be measured. Assuming that the area of the zone P is Sp, the area of the zone U is Su, the actual pressure on the zone P of each pressure point is calculated as $F_P$ according to the optimized pressure-resistance relationship and the resistance, and the actual pressure of each measuring unit is calculated as follows according to a calculation formula of the pressure and intensity of pressure:

$$F_n = F_P * \frac{s_P + s_U}{s_P};$$

As can be seen from the calculated actual pressure, when the pressure directions of the pressurized sensing points are the same, the overall pressure is obtained by superimposing all of the actual pressures: and if the pressure directions are different, the pressure of each sensing point is a positive pressure.

Based on the above pressure signal fitting method, in practical applications, it is possible to fit various resistance arrayed pressure signals such as a plantar pressure distribution, a palm grip distribution, a cushion pressure distribution, a backrest pressure distribution, etc., and be compatible with conventional pressure distribution measuring sensors from different manufacturers.

Correspondingly, the present disclosure further provides a pressure signal fitting apparatus, including a computer device that includes a processor and a memory, wherein the memory stores computer instructions, and the processor is configured to execute the computer instructions stored in the memory, and the apparatus realizes the steps of the aforementioned method when the computer instructions are executed by the processor.

To sum up, the present disclosure provides a pressure signal fitting method and apparatus, which can correct the measured pressure-resistance relationship through a numerical filtering algorithm, and fit the corrected pressure-resistance relationship according to appropriately selected curve fitting betweenness, thereby standardizing the signal fitting process and improving the signal measurement accuracy. In addition, the voltages of arrayed sensing points can be switched and measured by an integrated analog switch, thereby realizing the multi-channel signal switching and improving the signal acquisition efficiency.

The embodiments of the present disclosure further provide a computer-readable storage medium having a computer program stored thereon, wherein when executed by a processor, the computer program realizes the steps of the aforementioned method. The computer-readable storage medium may be a tangible storage medium, such as a random access memory (RAM), an internal memory, a read-only memory (ROM), an electrically programmable ROM, an electrically erasable programmable ROM, a register, a floppy disk, a hard disk, a removable storage disk, a CD-ROM, or any other form of storage medium known in the technical field.

Those of ordinary skill in the art will appreciate that the various exemplary components, systems, and methods described in conjunction with the embodiments disclosed herein can be implemented by hardware, software, or a combination thereof. The implementation mode depends on the specific application and design constraints of the technical solutions. Skilled persons can implement the described functions for each particular application using different methods, but such implementations should not be construed as going beyond the scope of the present disclosure. When the implementation is made by hardware, the hardware may be, for example, an electronic circuit, an application specific integrated circuit (ASIC), appropriate firmware, a plug-in, a function card, etc. When the implementation is made by software, the elements of the present disclosure are programs or code segments that are used to perform required tasks. A program or code segment may be stored in a machine-readable medium, or transmitted in a transmission medium or a communication link by a data signal carried in a carrier wave.

It should be noted that the present disclosure is not limited to the specific configurations and processes described above and illustrated in the drawings. The detailed descriptions of known methods are omitted here for the sake of brevity. In the above embodiments, several specific steps are described and illustrated as examples. However, the method process of the present disclosure is not limited to the specific steps described and illustrated, and various variations, modifications, additions, or changes in the order of the steps can be made by those skilled in the art after grasping the spirit of the present disclosure.

In the present disclosure, features described and/or illustrated for one embodiment can be used in the same way or in a similar way in one or more other embodiments, and/or combined with or substituted for features of other embodiments.

Those described above are merely preferred embodiments of the present disclosure, rather than limitations thereto. Various modifications and variations of the embodiments of the present disclosure will be apparent to those skilled in the art. Any modification, equivalent substitution, improvement, etc. made within the spirit and principle of the present disclosure should be included in the protection scope of the present disclosure.

The invention claimed is:

1. A pressure signal measuring method, comprising the steps of:

while applying a pressure to each of an array of sensing points in a pressure acquisition apparatus by a pressure applying device, measuring and integrating a relationship between the applied pressure and a resistance of each sensing point to obtain a pressure-resistance relationship, wherein the pressure acquisition apparatus comprises:

a plurality of the array of sensing points, each of which has a pressure sensing zone at which pressure is measured, and a non-pressure sensing zone at which pressure cannot be measured;

correcting the obtained pressure-resistance relationship by integration through a numerical filtering algorithm and fitting the corrected pressure-resistance relationship through a curve fitting formula to obtain an optimized pressure-resistance relationship;

switching the arrayed sensing points in the pressure acquisition apparatus to connect to a voltage sensing circuit by an integrated analog electronic switch to measure voltages of the plurality of arrayed sensing points pressurized respectively;

calculating resistances of the plurality of arrayed sensing points pressurized according to the measured voltages and in conjunction with an acquisition circuit in the pressure acquisition apparatus;

calculating pressures of the plurality of arrayed sensing points in the pressure acquisition apparatus through the optimized pressure-resistance relationship according to the calculated resistances, wherein the calculated pressures of the plurality of arrayed sensing points are pressures on pressure sensing zones of the plurality of arrayed sensing points; and based on areas of pressure sensing zones and non-pressure sensing zones of the plurality of sensing points pressurized, calculating actual pressures of the plurality of arrayed sensing points from the calculated pressures on the pressure sensing zones of the plurality of arrayed sensing points through a relationship between the pressures and areas, wherein each of the calculated actual pressures of the plurality of arrayed sensing points are a sum of the pressures on the pressure sensing zone and the non-pressure sensing zone of each arrayed sensing point.

2. The method according to claim 1, further comprising visually displaying the optimized pressure-resistance relationship through a point depiction method using drawing software.

3. The method according to claim 1, wherein measuring voltages of a plurality of arrayed sensing points pressurized respectively comprises:

measuring voltages of the plurality of arrayed sensing points pressurized by an on-chip integrated analog electronic switch or an off-chip digital-to-analog converter.

4. The method according to claim 3, further comprising outputting the measured voltages through a conversion unit of the digital-to-analog converter.

5. The method according to claim 1, further comprising appropriately increasing or decreasing the number of the integrated analog electronic switches based on the number of rows and columns of the pressure sensor.

6. The method according to claim 1, further comprising displaying a zone where the pressure applying device applies the pressure to the arrayed sensing points through a heat map.

7. The method according to claim 1, wherein fitting the corrected pressure-resistance relationship through a curve fitting formula comprises:

selecting corresponding curve fitting betweenness to fit the corrected pressure-resistance relationship.

8. The method according to claim 1, wherein each of the actual pressures of the plurality of arrayed sensing points are calculated based on the following formula:

$$F_n = F_P * \frac{s_P + s_U}{s_P};$$

wherein, $S_p$ is the area of the pressure sensing zone P of each sensing point, $S_u$ is the area of the non-pressure sensing zone U of each pressure point, $F_P$ is the actual pressure of the pressure sensing zone P, and $F_n$ is the actual pressure of corresponding sensing point.

9. A pressure signal measuring apparatus comprising a processor and a non-transitory memory, wherein the non-transitory memory stores computer instructions, and the processor is configured to execute the computer instructions stored in the non-transitory memory, wherein, when the instructions are executed, the apparatus performs the following:

while applying a pressure to each of an array of sensing points in a pressure acquisition apparatus by a pressure applying device, measuring and integrating a relationship between the applied pressure and a resistance of each sensing point to obtain a pressure-resistance relationship, wherein the pressure acquisition apparatus comprises:

a plurality of the array of sensing points, each of which has a pressure sensing zone at which pressure is measured, and a non-pressure sensing zone at which pressure cannot be measured;

correcting the pressure-resistance relationship obtained by integration through a numerical filtering algorithm, and fitting the corrected pressure-resistance relationship through a curve fitting formula to obtain an optimized pressure-resistance relationship;

switching the arrayed sensing points in the pressure acquisition apparatus to connect to a voltage sensing circuit by an integrated analog electronic switch to measure voltages of the plurality of arrayed sensing points pressurized respectively;

calculating resistances of the plurality of arrayed sensing points pressurized in the pressure acquisition apparatus according to the measured voltages and in conjunction with an acquisition circuit;

calculating pressures of the plurality of arrayed sensing points in the pressure acquisition apparatus through the optimized pressure-resistance relationship according to the calculated resistances, wherein the calculated pressures of the plurality of arrayed sensing points are pressures on the pressure sensing zones of the plurality of arrayed sensing points; and based on areas of pressure sensing zones and non-pressure sensing zones of the plurality of sensing points pressurized, calculating actual pressures of the plurality of arrayed sensing points from the calculated pressures on the pressure sensing zones of the plurality of arrayed sensing points through a relationship between the pressure and an intensity of pressure and areas, wherein each of the calculated actual pressures of the plurality of arrayed sensing points are a sum of the pressures on the pressure sensing zone and the non-pressure sensing zone of each arrayed sensing point.

10. The apparatus according to claim 9, further comprising visually displaying the optimized pressure-resistance relationship through a point depiction method using drawing software.

11. The apparatus according to claim 9, wherein measuring voltages of a plurality of arrayed sensing points pressurized respectively comprises:

measuring voltages of the plurality of arrayed sensing points pressurized by an on-chip integrated analog electronic switch or an off-chip digital-to-analog converter.

12. The apparatus according to claim 11, further comprising outputting the measured voltages through a conversion unit of the digital-to-analog converter.

13. The apparatus according to claim 9, further comprising appropriately increasing or decreasing the number of the integrated analog electronic switches based on the number of rows and columns of the arrayed sensing points in the pressure acquisition apparatus.

14. The apparatus according to claim 9, further comprising displaying a zone where the pressure applying device applies the pressure to the arrayed sensing points through a heat map.

15. The apparatus according to claim 9, wherein fitting the corrected pressure-resistance relationship through a curve fitting formula comprises:

selecting corresponding curve fitting betweenness to fit the corrected pressure-resistance relationship.

16. The apparatus according to claim 9,
wherein each of the actual pressures of the plurality of arrayed sensing points are calculated based on the following formula:

$$F_n = F_P * \frac{s_P + s_U}{s_P};$$

wherein, $S_P$ is the area of the pressure sensing zone P of each sensing point, $S_U$ is the area of the non-pressure sensing zone U of each pressure point, F, is the actual pressure of the pressure sensing zone P, and $F_n$ is the actual pressure of corresponding sensing point.

\* \* \* \* \*